United States Patent [19]

Wolf

[11] Patent Number: 4,933,077
[45] Date of Patent: Jun. 12, 1990

[54] WATER SEPARATOR FOR A FUEL SYSTEM

[75] Inventor: Gilbert Wolf, 7412 Laramie, Skokie, Ill. 60077

[73] Assignee: Gilbert Wolf, Skokie, Ill.

[21] Appl. No.: 222,965

[22] Filed: Jul. 21, 1988

[51] Int. Cl.$^5$ .............................................. B01D 23/00
[52] U.S. Cl. .................................... 210/187; 210/533; 210/249; 123/557; 165/52
[58] Field of Search ............... 210/175, 181, 187, 256, 210/257.1, 532.1, 533, 249, ; 123/557; 165/51, 52

[56] References Cited

U.S. PATENT DOCUMENTS

| | | | |
|---|---|---|---|
| 2,337,893 | 12/1943 | Hutterer | 210/175 |
| 4,091,782 | 5/1978 | Dunnam | 165/51 |
| 4,395,996 | 8/1983 | Davis | 210/181 |

Primary Examiner—W. Gary Jones
Assistant Examiner—Matthew O. Savage
Attorney, Agent, or Firm—Leydig, Voit & Mayer

[57] ABSTRACT

A water separating apparatus for a fuel system comprises a reservoir and a heat exchanger disposed inside the reservoir. Through a heat exchange process, fuel flowing through the reservoir is heated to melt ice crystals in the fuel and to cause water contaminants in the fuel to precipitate from the fuel. The reservoir includes a coolant inlet, a coolant outlet, a fuel inlet and a fuel outlet, and has a flat side for mounting onto a flat mounting surface. Coolant lines connect the coolant inlet and the coolant outlet to a source of fluid bearing waste heat. The heat exchanger includes at least one tube running between the coolant inlet and the coolant outlet. The heat exchanger also includes an enclosure disposed so as to enclose a portion of the tube and define a pre-heat chamber. Openings in the enclosure provide communication between the fuel inlet and the pre-heat chamber, and between the pre-heat chamber and the fuel outlet. The outer dimensions of the reservoir are chosen such that the apparatus fits within a desired space in an engin compartment.

16 Claims, 3 Drawing Sheets

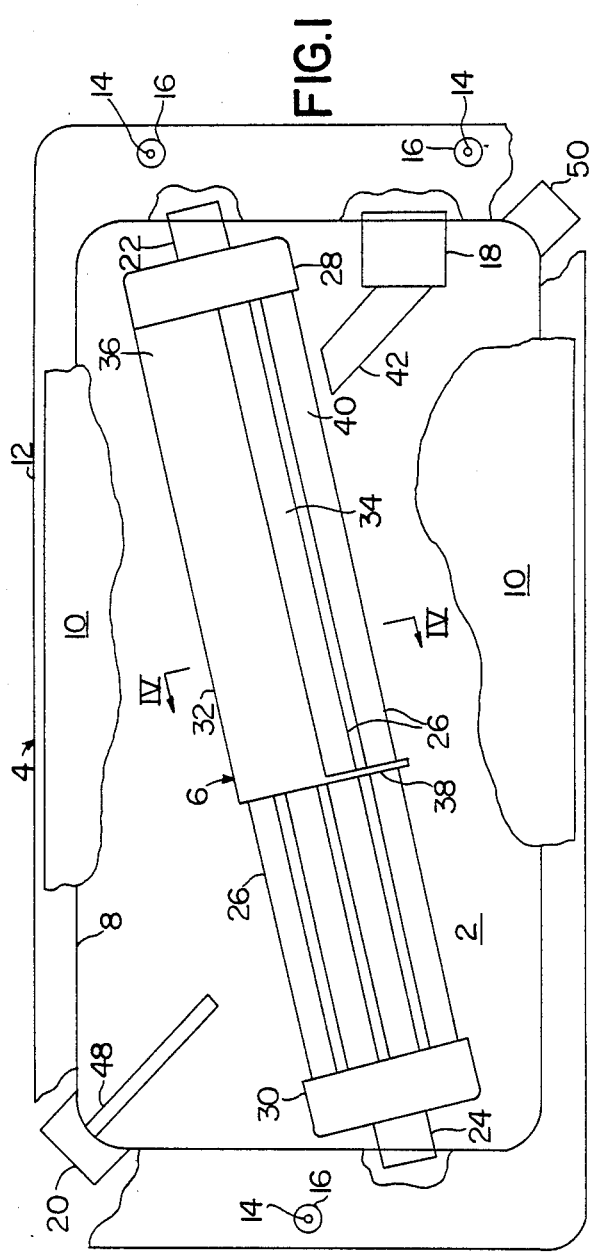
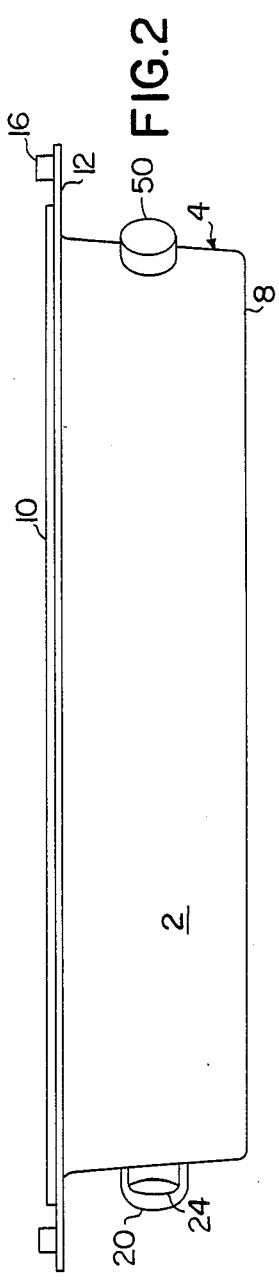
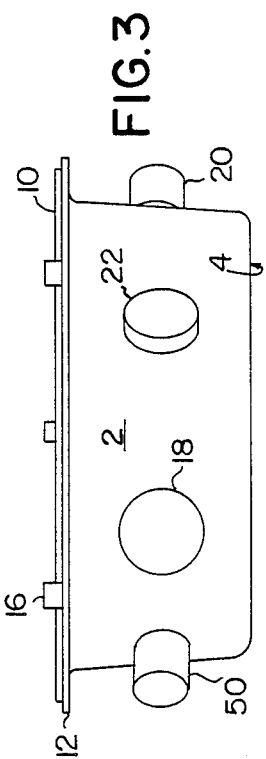

WATER SEPARATOR FOR A FUEL SYSTEM

TECHNICAL FIELD

The present invention relates to fuel systems and, in particular, to apparatus for separating water or ice contaminants from fuel by heating the fuel.

BACKGROUND OF THE INVENTION

Whenever the fuel tank or the fuel line of an engine is exposed to low ambient temperatures, the fuel, or certain additives or impurities in the fuel, may gel or "wax". That is, the viscosity of the fuel, additives, or impurities increases to such a degree that the fuel no longer flows well through the fuel system. For example, the diesel fuel in the fuel tanks or fuel lines of diesel trucks may wax if the truck is driven or parked in extremely cold weather. Since waxing can interfere with the proper flow of fuel to the engine, it frequently results in poor engine performance. Severe waxing may even block the flow of fuel entirely, stalling the engine.

In addition, fuel frequently becomes contaminated with water. Sometimes water contaminants are already present in fuel when the fuel is added to the fuel tank. Improper handling or poor refining may introduce water contaminants to fuel. Moreover, water condensation inside a fuel tank sometimes takes place following outside air intrusion into the fuel tank. At low temperatures, water contamination can take the form of ice crystals suspended in the fuel. Fuel contaminated with water or ice crystals also causes poor engine performance or stalling.

Waxing may be eliminated by heating the fuel. Also, heating the fuel melts ice crystals and tends to cause water contaminants to precipitate from the fuel. Although heating the fuel may eliminate any waxing or icing, the water, in liquid form, may collect within the fuel system, for example, inside the fuel tank or inside a fuel filter disposed downstream from the fuel tank.

There have been many proposed devices for heating fuel to eliminate waxing and icing, to precipitate the water, and to purge water from the fuel system. Many such devices employ tubes which circulate a heatable fluid, for example, a fluid bearing waste heat, such as engine coolant, motor oil, or exhaust gas, through a reservoir of fuel. The fuel is then heated via a heat exchange process. However, frequently a considerable period of time is required for the exhaust gas, coolant, or oil to become hot and for the hot gas, coolant, or oil to heat the fuel sufficiently to melt ice crystals suspended in the fuel and to cause water to precipitate from the fuel. This problem is especially severe for large fuel reservoirs. Further, the fuel may not be effectively maintained in contact with the heat exchanger to ensure that the fuel is efficiently heated. Consequently, the engine may perform poorly for a long period of time following a cold start.

Another undesirable characteristic of many conventional fuel heating and water separating devices has to do with the placement of the device. First, physical contact between the water separating device and a mounting surface to which the device is mounted causes considerable conductive heat loss, disadvantageously lengthening the time required for heating the fuel sufficiently to eliminate waxing, melt any ice crystals present in the fuel, and cause water to precipitate from the fuel. Second, this type of water separating device is inflexible regarding placement and takes poor advantage of available space. Depending on the overall configuration of the vehicle in which the fuel system is installed, the water separating device might be very difficult to get at, or it might be in the way of other engine components that might require easy access for periodic maintenance.

SUMMARY OF THE INVENTION

The present invention provides an apparatus which separates water and ice crystal contaminants from fuel in a fuel system by heating the fuel to cause the ice crystals to melt and to cause the water to precipitate from the fuel. The apparatus comprises a reservoir disposed in a fuel line and a heat exchanger disposed inside the reservoir. The reservoir includes a fuel inlet, a fuel outlet, a coolant inlet, and a coolant outlet. The heat exchanger is disposed inside the reservoir and includes at least one tube running between the coolant inlet and the coolant outlet. The heat exchanger further includes an enclosure disposed around at least a portion of the tube. The enclosure includes at least a portion of a cylindrical shell which has first and second ends and a baffle disposed at the first end of the shell to define a pre-heat chamber through which the tube runs.

A water separating device in accordance with the present invention is advantageous over conventional water separating devices in that the enclosure better maintains the fuel adjacent to the tubes, providing for a more effective transfer of heat between the heat exchanger and the fuel and an increase in the fuel temperature in a shorter elapsed time, compared with a conventional device.

BRIEF DESCRIPTION OF THE DRAWINGS

FIG. 1 is a top view of a water separating apparatus embodying the present invention, in which portions of a flat side 10 and a flange 12 are cut away to permit a view of the interior of the apparatus;

FIG. 2 is a side view of the apparatus of FIG. 1;

FIG. 3 is an end view of the apparatus of FIG. 1;

DETAILED DESCRIPTION OF THE PREFERRED EMBODIMENT

Figure 4:
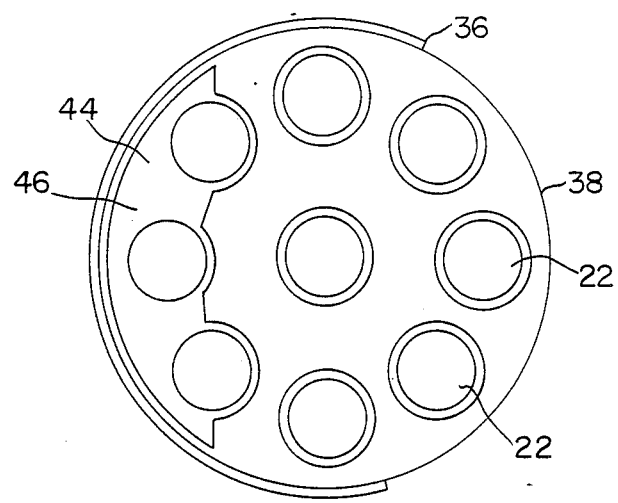
FIG. 4 is a cross-sectional view of the heat exchanger assembly of FIG. 1, taken substantially on the line IV—IV of FIG. 1 and looking in the direction of the arrows.

Referring to FIGS. 1-4, there is shown an exemplary water separating apparatus embodying the present invention. The water separating apparatus 2 generally comprises a reservoir 4 and a heat exchanger 6. The reservoir 4 includes a container 8 which is generally in the shape of a rectangular prism or parallelpiped. For mounting the water separating apparatus 2 on a convenient flat mounting surface, the reservoir 4 also includes a flat side 10 and a mounting arrangement, herein shown as a flange 12 running around the perimeter of the flat side 10 and substantially flush therewith, and mounting holes 14. In FIG. 1, a portion of the flat side 10 and the flange 12 are cut away to provide a view of the interior of the apparatus. The water separating apparatus may thus be mounted onto a flat mounting surface by means of fasteners such as bolts or rivets.

Spacers provide a gap between the flat side 10 of the reservoir 4 and a flat mounting surface on which the apparatus is mounted. The spacers are shown here as mounting bosses 16 disposed around the mounting holes 14 on the side of the flange 12 substantially flush with the flat side 10. The gap between the flat side 10 and the flat mounting surface advantageously limits heat conduction between the apparatus and the flat mounting surface, thereby improving the speed and efficiency with which the fuel is heated. Additionally, the gap provides room for a thermal insulator 102 (FIG. 5), such as a thermal insulating blanket, to be wrapped around the apparatus to further prevent heat loss.

An apparatus in accordance with the invention may be mounted on any flat mounting surface, such as an outer surface of an engine, a frame rail, or a fire wall. The location at which the apparatus 2 is mounted may be determined on the basis of design criteria such as ease of access or maximum utilization of space. In particular, it is contemplated that an apparatus in accordance with the invention shall be of dimensions appropriate to fit within spaces made available by current vehicle designs. For instance, newer, smaller vehicle designs have left an increasingly narrow space between the engine and the outer body of the vehicle. The embodiment illustrated in FIGS. 1–3 has dimensions 15"×7⅞"×2½". The present embodiment could thus be mounted on a vertical or horizontal flat mounting surface between the engine and the vehicle body if the clearance between the engine and the vehicle body is sufficient to accommodate an apparatus 2½" thick. Other embodiments within the scope and spirit of the invention may be of dimensions appropriate to accommodate dimensional restrictions of other spaces.

Figure 5:
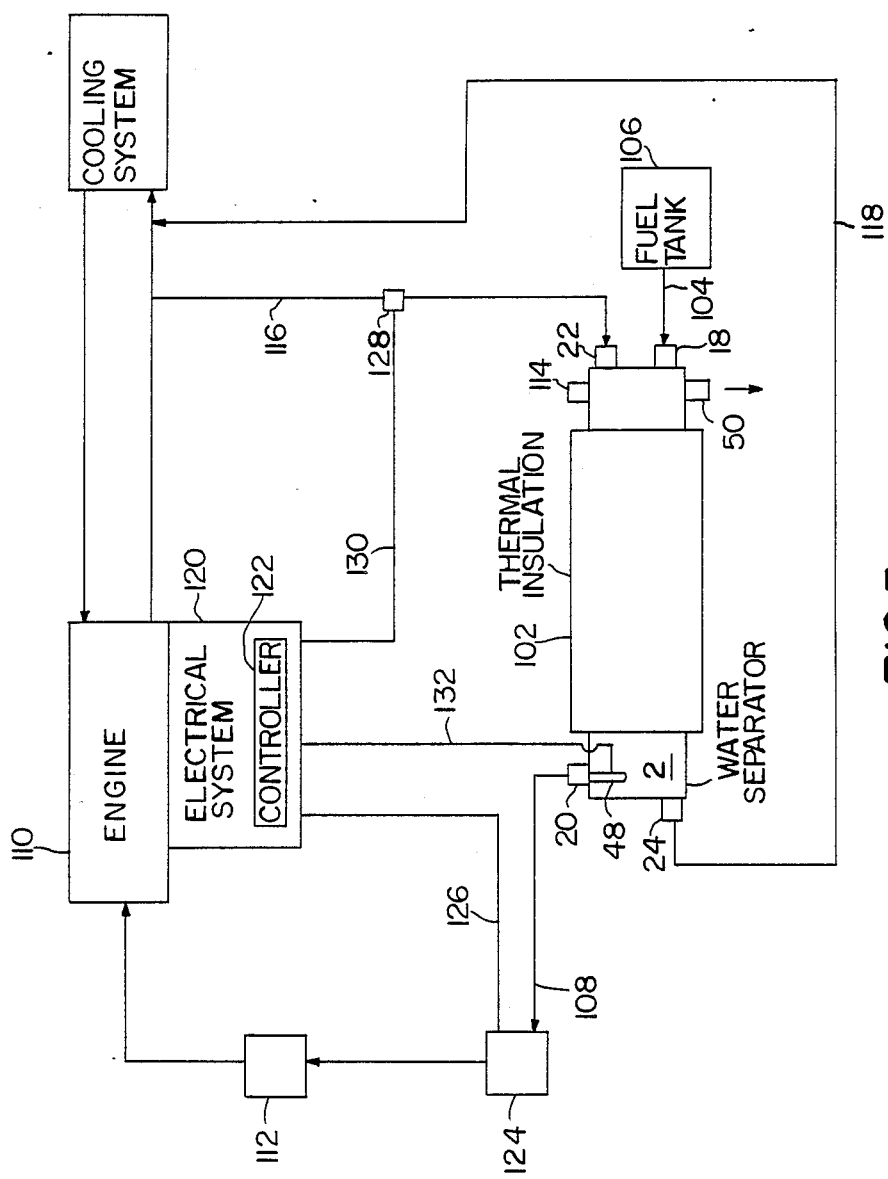
FIG. 5 is a schematic block diagram of a vehicle fuel system employing an apparatus in accordance with the invention.

The reservoir 4 also includes a fuel inlet 18 and a fuel outlet 20 disposed in the container 8 for communication between the inside of the container 8 and other fuel system components. Referring additionally to FIG. 5, a first portion 104 of a fuel line runs from a fuel tank 106 to the fuel inlet 18, and a second portion 108 of a fuel line runs from the fuel outlet 20 to an engine 110. The portions 104, 108 of the fuel line may be attached to the fuel inlet 18 and the fuel outlet 20 by any appropriate means, such as clamping or screwing. Also, a fuel system in which an apparatus according to the invention is used may also include a fuel filter 112 disposed downstream from the apparatus. Such a fuel filter 112 may be disposed in the second portion 108 of the fuel line, as shown in FIG. 5. Alternatively, the reservoir 4 may be designed to have an aperture with a fuel filter mounting arrangement, such as a screw mount. In such an alternative embodiment of the invention, outgoing fuel would flow through the fuel filter before proceeding downstream from the apparatus to the engine. The reservoir 4 may also include a pressure relief valve 114 for relieving any excess pressure inside the reservoir 4 that, if unrelieved, might damage the apparatus 2.

The reservoir 4 also includes a coolant inlet 22 and a coolant outlet 24, which are connected via coolant lines 116, 118 to any convenient source of fluid bearing waste heat, such as exhaust gas, engine coolant, or motor oil. In FIG. 5, the coolant lines 116, 118 connect the apparatus 2 to the vehicle cooling system to utilize engine coolant as the waste heat bearing fluid. Engine coolant is regarded as the preferred choice because of its relatively low corrosiveness. The coolant lines may be connected to the coolant inlet 22 and the coolant outlet 24 by clamping, screwing, or any other appropriate means.

The heat exchanger 6 comprises at least one tube 26 running between the coolant inlet 22 and the coolant outlet 24 through the container 8 of the reservoir 4. In the present embodiment, the heat exchanger 6 includes several tubes 26 running in an essentially parallel fashion between the coolant inlet 22 and the coolant outlet 24, but the disposition of the tubes may also vary within the scope of the invention. A first header 28 distributes incoming coolant from the coolant inlet 22 to the tubes 26. A second header 30 integrates coolant from the tubes 26 and directs the coolant out through the coolant outlet 24. In the present embodiment, nine tubes 26 are shown (see FIG. 4), but the number and size of the tubes may vary within the scope of the invention. For instance, the tubes might alternatively be disposed in a multiple helical fashion. Alternatively, tubes with finned structures for increasing the surface area-to-volume ratio of the tubes, may be used. Also, while first and second headers 28, 30 are shown in conjunction with the disclosed embodiment, other means for distributing coolant to and integrating coolant from a plurality of tubes, such as splitting elements ("Y" connectors) may be used.

The heat exchanger 6 also comprises an enclosure 32 disposed inside the container 8 of the reservoir 4. The enclosure 32 partially surrounds a portion of the tubes 26 to define a pre-heat chamber 34. Fuel flowing into the pre-heat chamber 34 is better maintained adjacent to the tubes 26 within the pre-heat chamber 34 and thus is heated more efficiently, thereby further encouraging water contaminants to precipitate out of the fuel. In the present embodiment the enclosure 32 is of generally cylindrical shape and is made up of a half-cylindrical shell 36 disposed essentially coaxially with the tubes 26 and a baffle plate 38 at another end of the shell 36. Alternatively, the enclosure 32 could have other overall shapes, and could be constructed either in a one-piece fashion or be made up of a plurality of enclosure components.

The enclosure 32 has a first opening 40 which communicates with the fuel inlet 18 to receive incoming fuel into the pre-heat chamber 34. In the present embodiment, the half-cylindrical shell 36 is disposed such that an open half of the shell 36 faces the fuel inlet 18. A fuel duct 42 extending from the fuel inlet 18 is disposed so as to direct incoming fuel through the first opening 40 into the pre-heat chamber 34. In alternative embodiments within the, spirit and scope of the invention, the first opening 40 could be of a different shape or size. Also, the fuel duct 42 could be connected to the enclosure 32 to direct all of the incoming fuel into the pre-heat chamber 34.

The enclosure 32 also has a second opening 44 which communicates with the fuel outlet 20 to direct outgoing heated fuel to the fuel outlet 20. In the present embodiment, the baffle plate 38 has an orifice 46 facing the fuel outlet 20. Heated fuel flowing out of the pre-heat chamber 34 through the orifice 46 is thus directed toward the fuel outlet 20. As stated above, the fuel confined inside the pre-heat chamber 34 is heated at an advantageously high rate, thereby further causing water contaminants to precipitate from the fuel and further eliminating waxing. Since this fuel is then directed out of the pre-heat chamber 34 through the orifice 46 to the fuel outlet 20 and on to the engine 110, engine performance is further enhanced.

To urge fuel to flow axially through the pre-heat chamber 34 toward the orifice 46, the fuel duct 42 is disposed at an acute angle relative to the axis of the half-cylindrical shell 36. As a consequence, incoming fuel directed into the pre-heat chamber 34 by the fuel duct 42 flows at the acute angle relative to the axis of the shell 36. The fuel is then re-directed along the axis of the shell 36 by the shell 36 itself. In alternative embodiments, heated fuel may be directed out of the reservoir 4 through the fuel outlet 20 by a duct running from the enclosure 32 to the fuel outlet 20, or by other appropriate flow directing structures such as baffles or active flow-directing devices such as pumps or propellers.

When a cold engine is first started, a period of time must elapse before fluids such as engine coolant and motor oil are sufficiently warm to heat the fuel sufficiently to prevent waxing and to cause water contaminants to precipitate from the fuel. Consequently, in accordance with the invention, an electric heating element 48 is disposed inside the reservoir 4 near the fuel outlet 20. Electric power supplied to the heating element 48 produces Joule heating, which heats the fuel sufficiently to melt any ice, to precipitate water contaminants from the fuel, and to substantially eliminate any waxing or jelling, permitting good engine performance even after a cold start. Consistent with the spirit and scope of the invention, the heating element 48 may be thus operated only during a cold start, at all times, or at any times necessary to produce good engine performance. Also, the heating element 48 may be operated at varying power levels under varying environmental conditions or for varying engine performance requirements. Also, the heating element 48 may be positioned at any part of the reservoir which, depending on the shape and dimensions of the reservoir, would enable the heating element 48 quickly to provide heated fuel to the engine for combustion.

The reservoir 4 also includes a water outlet 50 for purging water from the reservoir 4. As stated above, a device in accordance with the present invention advantageously increases the rate at which water contaminants precipitate out of the fuel by providing an improved arrangement for heating fuel before the fuel reaches the engine. As the fuel temperature increases, water contaminants tend to precipitate from the fuel and collect inside the reservoir 4 as liquid water. The presence of a sufficiently large quantity of such water can interfere with proper engine performance or damage the fuel system. The water outlet 50 includes a selective valve (not shown) which permits egress of water while substantially preventing egress of fuel.

Typically, water collects at the lowest point of the reservoir 4. It is desirable, then, that the overall shape of the apparatus 2 and the orientation of the apparatus 2 when mounted be such that the water outlet 50 is also at the lowest point. For instance, in the apparatus 2 of the disclosed embodiment, the water outlet 50 is located at a corner of the reservoir 4. The disclosed apparatus may advantageously be mounted on a vertical flat mounting surface such that the water outlet 50 is at the lowest point. Since the water outlet 50 is located at a corner, the apparatus 2 may be mounted such that the widest dimension is oriented horizontally, vertically, or diagonally while maintaining the water outlet 50 at the lowest point. Thus the disclosed embodiment provides advantageous mounting flexibility. Alternatively, the water outlet 50 may be positioned at any location on the reservoir 4 appropriate for bringing the water outlet 50 into close proximity to collecting water. Also, a water sensor (not shown) may be disposed inside the reservoir 4 to detect the presence of collecting water.

Turning to FIG. 5, a fuel system incorporating an apparatus according to the invention is depicted in schematic form. An electrical system 120 including a controller 122 is disposed in a vehicle to provide necessary power and control functions. As shown, the apparatus 2 may also include a temperature responsive element 124 such as a thermostat disposed so as to monitor the temperature of outgoing fuel, and to provide fuel temperature date to the controller 122 through a control line 126. The temperature responsive element 124 may be disposed downstream from the reservoir 4, such as downstream from the fuel outlet 20. A shut-off valve 128 may be disposed in the coolant line 116 upstream from the coolant inlet 22. A control line 130 carries open/close commands from the controller 122 to the shut-off valve 128. Thus the controller 122 may prevent the fluid bearing waste heat from flowing through the tubes 26, thereby terminating the heating of fuel, responsive to data received from the temperature responsive element 124. Also, a mechanical or electrical thermostatic valve responsive to fuel temperature may be disposed upstream or downstream from the water separating apparatus 2 to shut off fluid flow through the heat exchanger 6. In addition, the controller 122 may be connected through a control line 132 to heat the electric heating element 48 when the measured fuel temperature is below a predetermined threshold. Alternatively, the electric heating element 48 may be controlled manually or by a timer which heats the fuel for a predetermined period of time and then cease heating the fuel, without reference to a measured fuel temperature.

The reservoir 4, the tubes 26, and the enclosure 32 may be made of any material capable of withstanding the thermal and mechanical stresses typically encountered in an automotive environment, and capable of resisting chemical corrosion, such as stainless steel or other metals or alloys.

Although the present invention has been described in terms of one or more particular embodiments, it is not limited to these embodiments. Alternative embodiments and modifications which would still be encompassed by the invention may be made by those skilled in the art, particularly in light of the foregoing teachings. Therefore, the following claims are intended to cover any alternative embodiments, modifications or equivalents which may be included within the spirit and scope of the invention as defined by the claims.

What is claimed is:

1. An apparatus for separating water and ice from fuel in a fuel system, the apparatus comprising:

a reservoir including a fuel inlet for admitting fuel into the reservoir, a fuel outlet for discharging fuel from the reservoir, a heatable fluid inlet for admitting fluid bearing waste heat into the reservoir, a heatable fluid outlet for discharging the fluid bearing waste heat from the reservoir, and a water outlet for draining water from the reservoir, the reservoir being generally in the shape of a rectangular prism or parallelpiped and having a flat side with a mounting arrangement disposed thereon, the mounting arrangement providing a gap between the flat side of the reservoir and a surface on which the apparatus is mounted, the interior of the reservoir providing a fuel path between the fuel inlet and the fuel outlet; and a heat exchanger disposed inside the reservoir including a first header connected to the heatable fluid inlet, a second header connected to the heatable fluid outlet, a plurality of tubes running between the first header and the second header, a half-cylindrical shell disposed around at least a portion of the plurality of tubes and a portion of the fuel path generally parallel to the plurality of tubes, and a baffle disposed on an end of the half-cylindrical shell, the half-cylindrical shell and the baffle defining a pre-heat chamber, the half-cylindrical shell having an open portion communicating with the fuel inlet, the baffle having an orifice communicating with the fuel outlet, the fuel path running from the fuel inlet through the open portion of the half-cylindrical shell, into the pre-heat chamber, adjacent the portion of the plurality of tubes, through the orifice of the baffle, to the fuel outlet.

2. An apparatus as set forth in claim 1 further comprising thermal insulation substantially surrounding the reservoir.

3. A water separating apparatus for a fuel system comprising:
a fuel reservoir having a heatable fluid inlet, a heatable fluid outlet, a fuel inlet, and a fuel outlet and
a heat exchanger disposed inside the reservoir and including at least one tube extending between the heatable fluid inlet and the heatable fluid outlet and an enclosure disposed around at least a portion of the tube to define a pre-heat chamber, wherein the enclosure includes at least a portion of a shell having first and second ends and a baffle disposed on the first end of the shell to define the pre-heat chamber, the tube being disposed in the pre-heat chamber.

4. An apparatus as set forth in claim 3 wherein the enclosure includes a first opening communicating with the fuel inlet and a second opening communicating with the fuel outlet.

5. An apparatus as set forth in claim 3 wherein the cylindrical shell has an open portion facing the fuel inlet.

6. An apparatus as set forth in claim 3 wherein the baffle has an opening facing the fuel outlet.

7. An apparatus as set forth in claim 3 wherein the reservoir, the tube, and the enclosure are made of stainless steel.

8. An apparatus as set forth in claim 3 wherein the reservoir further comprises a flat side and a mounting flange disposed around the perimeter of the flat side essentially flush therewith.

9. An apparatus as set forth in claim 8 wherein the reservoir further comprises a plurality of mounting bosses disposed on the mounting flange.

10. An apparatus as set forth in claim 3 further comprising a thermal insulator surrounding the reservoir.

11. An apparatus as set forth in claim 3 further comprising an electric heating element disposed inside the reservoir.

12. An apparatus as set forth in claim 3 wherein the fuel reservoir has a flat side.

13. An apparatus as set forth in claim 3 wherein the fuel reservoir further includes a fuel duct which extends from the fuel inlet toward the preheat chamber to direct incoming fuel into the preheat chamber.

14. An apparatus as set forth in claim 3 wherein the heat exchanger includes a first header communicating with the heatable fluid inlet, a second header communicating with the heatable fluid outlet, and a plurality of tubes extending between the first and second headers.

15. An apparatus as set forth in claim 3 wherein the reservoir further includes a water outlet for draining water from the separator.

16. An apparatus as set forth in claim 3 wherein the shell has a generally cylindrical configuration.

* * * * *

UNITED STATES PATENT AND TRADEMARK OFFICE
CERTIFICATE OF CORRECTION

PATENT NO. : 4,933,077
DATED : June 12, 1990
INVENTOR(S) : Gilbert Wolf et al

It is certified that error appears in the above-identified patent and that said Letters Patent is hereby corrected as shown below:

On the title page, item [19] "Wolf" should read --Wolf et al--";
and item [75] Inventor: should read as follows:

--Gilbert Wolf, Skokie, Ill.; Donald G. Murphy, Fort Wayne; James W. Webster; New Haven, all of Ind.--.

Signed and Sealed this

Eighth Day of December, 1992

Attest:

DOUGLAS B. COMER

Attesting Officer

Acting Commissioner of Patents and Trademarks